United States Patent Office 3,489,787
Patented Jan. 13, 1970

3,489,787
PROCESS FOR OXIDATION OF ALKANES AND ALKENES TO NITRILES
Alvin B. Stiles, Wilmington, Del., assignor to E. I. du Pont de Nemours and Company, Wilmington, Del., a corporation of Delaware
No Drawing. Continuation-in-part of application Ser. No. 293,156, July 5, 1963. This application Nov. 25, 1966, Ser. No. 596,817
Int. Cl. C07c 121/02, 51/20; C07d 1/08
U.S. Cl. 260—465.3                              7 Claims

ABSTRACT OF THE DISCLOSURE

A process for preparing nitriles from alkanes and alkenes having 2–4 carbon atoms using a silver-cadmium alloy catalyst having 1–15%, by weight, cadmium is disclosed.

CROSS-REFERENCE TO RELATED APPLICATIONS

This application is a continuation-in-part of my copending application Ser. No. 293,156, filed July 5, 1963, now U.S. Patent 3,334,143, issued Aug. 7, 1967, which is in turn a continuation-in-part of my then copending application Ser. No. 2,802, filed Jan. 18, 1960, now abandoned.

BACKGROUND OF THE INVENTION

This invention relates to silver catalysts and is more particularly directed to uniform, non-porous silver catalysts which contain small amounts of cadmium and to selective oxidation processes employing such catalysts.

Silver catalysts have heretofore been widely used as selective oxidation catalysts. They have been used for example in the oxidation of methanol to produce formaldehyde and in a variety of other reactions of organic compounds which involve oxidation often accompanied by dehydrogenation.

It has been found that the inclusion of a small amount of cadmium uniformly distributed throughout non-porous silver catalysts effects better conversion in organic oxidation processes without loss of yield and, in those processes involving it, effects better dehydrogenation.

Silver catalysts are already in wide use for oxidation processes and porous silver-cadmium alloys have been found suitable for some oxidations, MacCormack and Harrow, U.S. Patent No. 2,837,473. However, activity of such alloys was dependent on porosity. It has been discovered that uniform, non-porous silver-cadmium alloys give better results than those normally obtained with silver catalysts, and surprisingly give better results than porous alloys. It is advantageous to effect methanol oxidation in mixtures with air which are rich in methanol to minimize the size of the equipment required for the reaction. The conversion of methanol to formaldehyde in a methanol-rich process proceeds both by oxidation and by dehydrogenation. Catalysts of the present invention are more effective for both reactions than the usual silver catalysts or porous silver-cadmium alloys.

SUMMARY OF THE INVENTION

By the use of catalysts of this invention, selective oxidation of organic compounds is markedly improved. Selective oxidation means oxidation which stops selectively short of complete oxidation to carbon dioxide and water. The silver-cadmium alloy catalysts are suitable for catalysis of organic compounds generally oxidized over silver catalysts.

Catalysts of the invention can be made in any convenient manner and ordinarily an alloy with silver and cadmium will be prepared simply by fusing the two components together in the desired proportions. Instead, finely divided powders of the two metals can be brought together and sintered to form what is, still, essentially an alloy.

Preparation of catalysts by such processes results in a smooth non-porous alloy in which the cadium is uniformly distributed throughout the silver.

The amount of cadmium can vary from about 1 to 15% by weight based upon the weight of silver. Amounts much less than 1% ordinarily will not produce effects of any significant magnitude. Above 15% the directivity of the catalysts falls off and the catalyst additionally becomes lower melting.

The silver catalysts of the invention can be prepared in any convenient form of the type heretofore used for silver. Thus the silver-cadmium alloys can be formed as wire, as silver gauze, as machine turnings, or as pellets. Additionally the silver can be supported upon various carriers in conventional manner, it being sufficient for the purposes of the invention that the uniform, non-porous silver alloy be presented to the organic materials to be reacted.

Catalysts of the invention can effectively be used for any of the catalytic reactions for which silver has heretofore been employed. Thus they can be used for such reactions as the following:

(1) Oxidation of lower alcohols containing 1 to 4 carbon atoms, e.g., oxidation and dehydrogenation of methanol to formaldehyde;

(2) Oxidation of lower alkanes containing 2 to 4 carbon atoms, e.g., oxidation of propane and ammonia to acrylonitrile or oxidation of butane to succinic acid;

(3) Oxidation of lower alkenes containing 2 to 4 carbon atoms, such as:

(a) oxidation of ethylene to ethylene oxide,
(b) oxidation of propylene to propylene oxide,
(c) oxidation of propylene to acrolein,
(d) oxidation of propylene to acrylic acid, or
(e) oxidation of propylene and ammonia to acrylonitrile;

(4) Oxidation of aryls to their open-ring oxidation products, e.g., oxidation of benzene to maleic acid and fumaric anhydride or oxidation of naphthalene to phthalic anhydride.

The aryl compounds suitable for oxidation can be both unsubstituted and mono-, di-, and tri-substituted aryls. Suitable substituents include the lower alkanes and alkenes. Representative of suitable substituted aryls are xylene, durene, and toluene.

DESCRIPTION OF THE PREFERRED EMBODIMENTS

A preferred catalyst of this invention, for use in the oxidation processes where silver has customarily been used as a catalyst, is a silver-cadmium alloying containing from 4 to 10% cadmium based on the weight of silver. Such amounts of cadmium are most consistent in producing high conversion without loss of yield.

The preferred subjects for oxidation processes employing silver-cadmium catalysts of this invention are the lower alkanes and alkenes, both in the presence and absence of ammonia, and the lower alkanols. The most preferred subjects are propane in the presence and absence of ammonia, propylene in the presence and absence of ammonia, butane, ethylene and methanol.

The following examples illustrate the invention. Parts and percentages are by weight unless otherwise stated.

EXAMPLE 1

One hundred ninety parts of pure silver were fused with 10 parts metallic cadmium. The uniform ingot was machined in such a way as to produce wire filaments approximately 0.01 inch in diameter. These wires were inserted into a single tube reactor. An air-methanol mixture was fed to one end and the oxidized product was removed and quickly cooled at the other. The reactor was heated externally to initiate the reaction. Air to methanol ratios were altered to attain various reaction temperatures. This catalyst was evaluated at 600° C. and 700° C. with the following results:

| Catalyst | Temperature ° C. | Of 100 moles of $CH_3OH$ | | |
|---|---|---|---|---|
| | | Moles to HCHO | Moles unreacted | Moles to $CO+H_2$ |
| 95% Ag 5% Cd | 600 | 61.5 | 30.8 | 7.7 |
| 95% Ag 5% Cd | 700 | 75.4 | 16.0 | 8.6 |

Using 1% of cadmium the following results were obtained:

| Catalyst | Temperature ° C. | Of 100 moles of $CH_3OH$ | | |
|---|---|---|---|---|
| | | Moles to HCHO | Moles unreacted | Moles to $CO+H_2$ |
| 99% Ag 1% Cd | 600 | 57.9 | 34.7 | 7.4 |
| 99% Ag 1% Cd | 700 | 70.6 | 20.7 | 8.7 |

Using 10% of cadmium the following results were obtained:

| Catalyst | Temperature ° C. | Of 100 moles of $CH_2OH$ | | |
|---|---|---|---|---|
| | | Moles to HCHO | Moles unreacted | Moles to $CO+H_2$ |
| 99% Ag 10% Cd | 600 | 66.9 | 27.2 | 5.9 |
| | 700 | 71.4 | 15.3 | 13.3 |

In the following table the above results are compared with a silver catalyst not containing cadmium. Water was added to the airstream in the amount of 25% of the volume of the air used to increase yield in accordance with customary practices.

| Catalyst | Temperature ° C. | Of 100 moles of $CH_3OH$ | | |
|---|---|---|---|---|
| | | Moles to HCHO | Moles unreacted | Moles to $CO+H_2$ |
| Pure Ag | 600 | 52.8 | 38.2 | 9.0 |
| Pure Ag | 700 | 66.2 | 23.6 | 10.2 |

Water was not added when cadmium was used because it is unnecessary to add it to obtain high yields. Without the addition of water the silver catalyst alone will lead to decomposition which is not obtained with the catalysts of the invention. There is an advantage in omitting water because the equipment size is minimized and water need not be removed from the product.

It is noted incidentally that the high effectiveness of the catalysts of the invention in dehydrogenation leads to an off-gas which contains considerable usable hydrogen.

A catalyst containing 85% of silver and 15% of cadmium can similarly be used for the oxidation and dehydrogenation of methanol to formaldehyde.

The catalysts of the invention and especially those just described can similarly be used in processes in which silver catalysts have heretofore been employed. Thus the following additional examples are given in which the processes are conventional except for the catalyst used.

EXAMPLE 2

Ethylene is oxidized to ethylene oxide in 78% yield and 100% conversion at 400° C. when a stream comprising 2 to 4 volume percent ethylene in air is passed over the uniform, non-porous catalyst having a composition of 95% Ag and 5% Cd.

EXAMPLE 3

Propylene is oxidized to a mixture of acrylic acid and acrolein when a mixture comprising 7 volume percent $O_2$, 14 volume percent propylene and 79 volume percent nitrogen is passed at 400° C. over the uniform, non-porous catalyst having a composition of 85% Ag and 15% Cd. Conversion per pass is 70% by volume of the propylene and the yield to acrolein and acrylic acid totals 64% by volume. Higher temperatures favor higher conversions but lower yields, whereas lower temperatures favor lower conversions and higher yields.

EXAMPLE 4

Propane is oxidized also to a mixture of acrolein and acrylic acid when a mixture comprising 7 volume percent $O_2$, 14 volume percent propane and 79 volume percent water vapor is passed at 570° C. over the uniform non-porous catalyst having a composition of 91% Ag and 9% Cd. Conversion per pass is 62% by volume of the propane and the yield to acrolein and acrylic acid totals 60% by volume.

EXAMPLE 5

A mixture of two parts by volume propane, one part by volume oxygen and three parts by volume ammonia is reacted to produce acrylonitrile. The mixture is fed at 650° C. over a uniform 90% Ag, 10% Cd alloy as matted wires 0.01 inch in diameter. Conversion per pass is 20% by volume of the propane of which 60% by volume is converted to acrylonitrile.

EXAMPLE 6

A mixture of two parts by volume propylene, one part by volume oxygen and three parts by volume ammonia is reacted to produce acrylonitrile. The mixture is fed at 600° C. over a uniform 94% Ag, 6% Cd alloy as matted wires 0.01 inch in diameter. Conversion per pass is 22% by volume of the propylene of which 63% by volume is converted to acrylonitrile.

EXAMPLE 7

A mixture of 5 volume percent butane in air is converted to maleic anhydride over a uniform, non-porous catalyst comprising 95% Ag and 5% Cd. The temperature of oxidation is 375° C.; at this temperature 20% by volume of the butane is reacted and of this 20%, 70% by volume is converted to maleic anhydride.

EXAMPLE 8

A mixture of three volume percent of vaporized benzene and 97 volume percent air is converted over a uniform, non-porous 97% Ag, 5% Cd catalyst to maleic anhydride. The temperature of oxidation is 600° C. at which temperature the benzene is entirely converted. Eighty percent by volume of the benzene is converted to maleic anhydride.

EXAMPLE 9

Naphthalene is converted to phthalic anhydride utilizing a uniform, non-porous catalyst composed of 95% Ag and 5% Cd. The reaction temperature is 425° C. The feed composition is 4 volume percent naphthalene and 96 volume percent air, and the conversion is essentially 100% by volume. Of the naphthalene fed more than 90% by volume is converted to phthalic anhydride.

EXAMPLE 10

In Example 9, orthoxylene is substituted for the naphthalene and the orthoxylene volume percent is approximately 5 whereas that of air is approximately 95. Conversion of the orthoxylene is, from a practical standpoint complete, and of the orthoxylene fed, more than 80% by volume is converted to phthalic anhydride.

EXAMPLE 11

Cyclohexane is oxidized to a mixture of cyclohexanone and cyclohexanol when employing a uniform non-porous catalyst having a composition of 88% Ag and 12% Cd. In this case the catalyst is supported on a fused alumina granular support. A mixture of 6 percent of cyclohexane and 94 percent air is reacted over a catalyst composed of 85% Ag and 15% cadmium in the form of 0.01 inch diameter wires matted to form a catalyst mass. At a temperature of 190° C. essentially all of the cyclohexane was converted to oxidized products. Of the cyclohexane fed, slightly more than 70% by volume was reacted either to cyclohexanone or cyclohexanol.

In this and all of the foregoing examples it is understood that adequate means must be taken to control the temperature near the value specified. It should also be pointed out that the gas mixtures are, in this and some of the foregoing examples, in the explosive range. Adequate mixing and control devices must be provided to avoid uncontrolled flame propagation.

I claim:
1. In a process for preparation of mononitriles by the catalytic oxidation in the presence of ammonia using a silver catalyst of a material selected from the group consisting of:
 (A) alkanes having 2 to 4 carbon atoms and
 (B) alkenes having 2 to 4 carbon atoms,
 the improvement comprising using as the silver catalyst a uniform non-porous silver-cadmium alloy consisting essentially of silver which contains 1–15%, by weight, of cadmium.
2. The process of claim 1 wherein said catalyst consists essentially of silver which contains 4–10%, by weight, of cadmium.
3. In a process for the preparation of acrylonitrile by the catalytic oxidation in the presence of ammonia using a silver catalyst of a material selected from the group consisting of propane and propene, the improvement comprising using as the silver catalyst a uniform non-porous silver-cadmium alloy consisting essentially of silver which contains 1–15%, by weight, of cadmium.
4. The process of claim 3 wherein said material is propane.
5. The process of claim 4 wherein said catalyst consists essentially of silver which contains 4–10%, by weight, of cadmium.
6. The process of claim 3 wherein said material is propene.
7. The process of claim 6 wherein said catalyst consists essentially of silver which contains 4–10%, by weight, of cadmium.

References Cited

UNITED STATES PATENTS

| | | | |
|---|---|---|---|
| 2,837,473 | 6/1958 | MacCormack et al. | 204—140 |
| 3,118,928 | 1/1964 | Garrison | 260—465.3 |
| 3,156,735 | 11/1964 | Armstrong | 260—465.3 XR |
| 3,334,143 | 8/1967 | Stiles | 260—603 |

JOSEPH P. BRUST, Primary Examiner

U.S. Cl. X.R.

260—346.4, 346.8, 348.5, 533, 586, 603, 604, 631